United States Patent
Hoffman (10) Patent No.: US 8,311,772 B2
(45) Date of Patent: Nov. 13, 2012

(54) OUTLIER PROCESSING

(75) Inventor: Daniel Hoffman, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 508 days.

(21) Appl. No.: 12/643,342

(22) Filed: Dec. 21, 2009

(65) Prior Publication Data
US 2011/0153270 A1    Jun. 23, 2011

(51) Int. Cl.
*G06F 17/18* (2006.01)
(52) U.S. Cl. ......... 702/179; 702/190; 703/21; 705/7.25; 706/12
(58) Field of Classification Search .......... 702/19, 702/20, 22, 23, 127, 179, 189, 190; 703/21; 705/7.25; 706/12
See application file for complete search history.

(56) References Cited

U.S. PATENT DOCUMENTS

| | | | |
|---|---|---|---|
| 7,277,843 B1 * | 10/2007 | Wen et al. | 703/21 |
| 7,346,593 B2 * | 3/2008 | Takeuchi et al. | 706/12 |
| 7,783,510 B1 * | 8/2010 | Gilgur et al. | 705/7.25 |
| 7,917,338 B2 * | 3/2011 | Basak et al. | 702/190 |
| 8,078,427 B2 * | 12/2011 | Tischler et al. | 702/179 |

* cited by examiner

*Primary Examiner* — John H Le
(74) *Attorney, Agent, or Firm* — Schwegman, Lundberg & Woessner (57) ABSTRACT

Apparatus, systems, and methods may operate to acquire an original data set comprising a series of data points having an independent portion and a dependent portion, the dependent portion representing a measure of device performance that depends on at least one device characteristic represented by the independent portion. Additional activity may include identifying outlier data points in the series by determining, in comparison with all other members of the series, whether the outlier data points conform to a known trend of the series; transforming the original data set into a transformed data set by removing the outlier data points from the series; and publishing the transformed data set. Other apparatus, systems, and methods are disclosed.

20 Claims, 4 Drawing Sheets

OUTLIER PROCESSING

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code, screen shots, and images described below, and in any drawings appended hereto: Copyright© 2009, Teradata, Inc. of Miamisburg, Ohio—All Rights Reserved.

BACKGROUND

Data is often acquired in order to characterize properties of physical devices and/or their degree of functionality. Sometimes the data constitutes an accurate representation of these aspects, so that conclusions regarding the device and its operational characteristics can be reliably drawn directly from the data. In other cases, the set of data includes outlier data points, which is data that does not conform to the behavior of other points in the set.

Outlier data points (i.e., "outliers"), if included in data that is used to draw inferences about the device and/or its operations, can lead to erroneous conclusions. Thus, much effort may be spent in determining whether some portion of a particular data set is truly representative of the underlying trend that is present in the other data, or not.

DETAILED DESCRIPTION

To address some of the challenges described above, some embodiments operate to transform an original data set that includes outliers into a transformed data set by removing the outliers. This can be achieved by determining the trend of data in the original set, identifying the outliers that do not conform to the trend, and then removing the outliers from the original data set. The transformed data set can then be used to provide improved results in a multitude of situations, several of which will be explained below.

Figure 1:
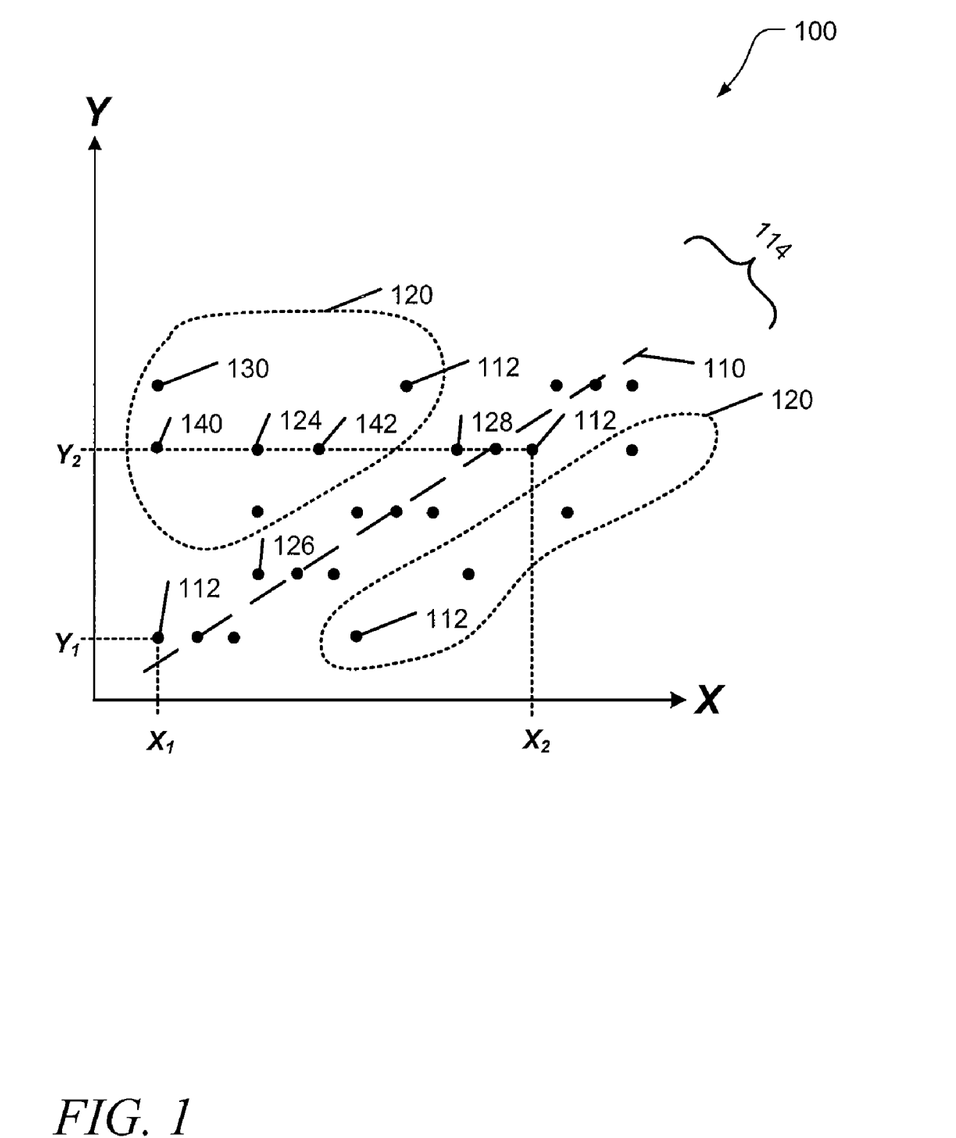
FIG. 1 is a graph illustrating an original data set that includes outlier data points, and a transformed data set according to various embodiments of the invention.

FIG. 1 is a graph illustrating an original data set 100 that includes outlier data points 120, and a transformed data set 114 according to various embodiments of the invention. To gain an understanding of how transformation of the original data set 100 may occur, one may begin by assuming that the original data set 100 comprises N points 112. The points 112 may comprise pairs of data $(X_i, Y_i)$, where i=1, . . . , N, and where $X_i$ is an independent variable and $Y_i$ is a dependent variable whose value is found by observation.

Next, one may assume that there is a known trend 110 (e.g., generally upward (as shown in FIG. 1), downward, etc.) associated with the original data set 100 that also includes the outlier data points 120. Thus, the points 112 may include points that generally conform to the trend 110, and those that do not (i.e., the outlier data points 120).

In most embodiments, the trend 110 is either known a priori (before the data set 100 is acquired), or assumed. If it is assumed, then the assumption may be verified after the data set 100 is acquired. The trend may be determined visually and/or by using various statistical methods available to those of ordinary skill in the art, including regression analysis, among others.

For example, consider the situation where the original data set 100 to be acquired represents some characteristic of hard drive disk operation. In this case, each point 112 may have an independent portion $X_i$ that represents a location on the drive platter that corresponds roughly to the distance from the outer edge of the platter, and a dependent portion $Y_i$ which represents the time measured to read data located at the distance represented by the corresponding independent portion $X_i$.

In this case, one may assume that the trend 110 in this case will be generally upward, as shown in FIG. 1, because those of ordinary skill in the art know that on average, access to data located on the inside on the platter will be slower than access to data located on the outside of the platter. This is because a larger amount of storage area passes by the disk head on the outer edge of the platter during one revolution of the platter, than on the inner edge. Therefore, it is reasonable to expect that as the variable X in the graph of FIG. 1 increases in value (e.g., as the logical block address (LBA) ascribed to a particular location on the platter increases), the corresponding value of the variable Y (e.g., average access time to data located at that LBA) in the graph of FIG. 1 will also increase—resulting in a known trend 110 that is generally in the upward direction.

Once all of the points 112 in the original data set 100 is acquired, it may be the case that the set 100 also includes a number of outlier data points 120. For example, the outlier data point 124 may not conform to the trend 110, even though either the independent portion of this point 124 or the dependent portion of this point 124 correspond to points 126, 128 that do conform to the trend 110.

In describing the relationship of a particular point 124 in the set 100 with surrounding points 112, that point 124 can be said to conform to the known upward trend 110 if both the independent $(X_i)$ and dependent $(Y_i)$ portion of the point 124 are equal to or greater than the independent and dependent portions of the preceding point 140 in the series, and less than or equal to the independent and dependent portions of the succeeding point 142 in the series.

The "preceding" point in a series of points 112 that make up the set 100 is one that has a dependent portion that is less than or equal to that of the point being considered. The "succeeding" point in a series of points 112 that make up the set 100 is one that has a dependent portion that is greater than or equal to that of the point being considered.

For a known downward trend (not shown in FIG. 1), the point 124 can be said to conform to the trend if both the independent (X) and dependent (Y) portion of the point 124 are equal to or less than the independent and dependent portions of the preceding point in the series, and greater than or equal to the independent and dependent portions of the succeeding point in the series.

It can be seen in FIG. 1 that there are unequal numbers of outlier data points 120 that lie above and below the known trend 110. If the numbers above and below the trend 110 were the same, simple averages could be applied to all points 112 in the data set 100 to extract the points conforming to the trend 110, and to provide the transformed data set 114. However, such is not the case. Indeed, not only are the numbers of outlier data points 120 that lie above and below the trend 110 not equal, the individual deviation of outlier data points 120 from the points conforming to the trend 110, and from the trend 110 itself, is also unequal.

Attempting to locate a line (e.g., a line more or less along the trend 110) that represents the underlying trend 110 of the data set 100 is usually computationally intensive. Moreover, it is unsatisfactory in many cases because even when weighted least-squares regression techniques are used, the outlier data points 120 can affect the location of the fitted line. Thus, in many embodiments, to reduce the computational intensity and more effectively remove the outlier data points 120 from the original data set 100, weighted filtering is applied instead.

Consider an original data set 100 that has a known upward or downward trend. Several points 112 $(X_i, Y_i)$ will then have a known relationship with the preceding point $(X_{i-1}, Y_{i-1})$ and the succeeding point $(X_{i+1}, Y_{i+1})$. For points in the series, as part of conforming to an upward trend, $(Xmax(i-1,0), Ymax(i-1,0)) \leq (Xi, Yi) \leq (Xmin(i+1,N), Ymin(i+1,N))$, where N is the number of points data points in the set 100. Similarly, as part of conforming to a downward trend, $(Xmax(i-1,0), Ymax(i-1,0)) \geq (Xi, Yi) \geq (Xmin(i+1,N), Ymin(i+1,N))$. This is sufficient to cover all points in the data set, where min(x,y) returns the lower value (x,y) and max(x,y) returns the higher value (x,y).

Using this relationship information, an algorithm can be developed to identify outlier data points 120 (i.e., points 120 in the set 100 that do not conform to the known trend 110) within the original data set 100. Essentially, each point 112 in the data set 100 has a chance to assign "blame" (e.g., a weighted value) to other points in the data set 100 based on its relationship in space to the other points, and therefore, to the data set 100 overall. Thus, the position of each point dictates whether it does or does not conform to the known trend 110. One form of such an algorithm can be stated as follows:

---
For each data point in the set,
  Compare with every other point in the data set;
    If the relationship agrees with the known trend, then
      Do nothing.
    If the relationship disagrees with the known trend, then
      Increase the blame counter for this point.
---

The algorithm can also be expressed in pseudo-code format as follows:

---
```
for (reference = n; reference > 0; reference--)
    for (i = 0; i < reference; i++)
        if (Y_i ? Y_reference)
            assign blame to Y_i
    for (i = n; i > reference; i--)
        if (Y_i ? Y_reference)
            assign blame to Y_i
```
---
Here, the "?" symbol may stand for either > or <, depending on weather the known trend is upward, or downward.

After all blame is assigned, the data point 130 that has been assigned the most blame (e.g., weight) is considered to be a member of the set of outlier data points 120. This particular outlier data point (e.g., point 130) is then removed from the original data set 100, along with any blame it assigned to other points. That is, any blame that a newly identified outlier point assigned to other points is invalidated once it is identified as an outlier. Then the next outlier data point is identified by determining which remaining point now has the most blame, and the process is repeated. In this way, once a point has been identified as an outlier, it's influence on the data set is removed before the next outlier point is identified.

As each outlier data point 120 is removed from the original data set 100, each of the remaining points is then compared with all other remaining points, as described above. This process is repeated until no more blame is assigned to the data points that remain. These final, remaining data points comprise the transformed data set 114.

The process of transforming the original data set 100 can be applied to many real-world situations. The aforementioned determination of disk drive platter access time is just one of them.

For example, the transformed data set 114 resulting from the removal of the outlier data points 120 can be used to determine the best initial placement of data on a drive platter or in a physical memory device, such as storing more frequently-accessed data on the faster (e.g., on average) portions of the device to provide improved overall data access performance.

For disk drives in particular, the variance in response times is often due to the random location of the device head and the seek time from the random starting location to the desired read location. Thus, the mechanism described herein can operate to remove outlier data points 120 representing the seek time in the acquired performance data, revealing true relative performance numbers across the drive platter. Some embodiments can be used in applications that involve multiple drive platters—to characterize a group of drives within an array of disks (e.g., to avoid the influence of a failing disk that performs in a way that produces outlier data points 120).

Still considering the realm of storage devices, such as disk drives, this mechanism can be applied to another aspect of performance: frequency of access and data placement. For example, assume "data placement location" is the independent variable, with values spanning the spectrum of fast access times to slow access times. Assume that "frequency of access" is the dependent variable, with values spanning a spectrum of counter values that are frequently accessed, to those that are infrequently accessed. In some embodiments, the fast access placement locations are matched to more frequently accessed data. As performance improves, outlier data points 120 will be moved into the known trend 110.

In contrast with the previous application where the outliers are thrown away because identifying the trend is most important, this application places value on the outliers themselves. Moving the data points with the most assigned blame (e.g., those points whose frequency of access deviates by the greatest amount from the performance of their location placement) provides a greater benefit when that data is moved to a placement location that more closely corresponds to its frequency of access.

Several advantages may arise when such mechanisms are employed. For example, these methods can be applied to extract transformed data sets that provide a more realistic random read response time across a device, filtering out the effects of mechanical/material limitations, such as track-to-track transfer times and rotational latency in a disk drive device. Linear regression techniques can be applied to the transformed data set to map the LBA of a disk drive to the average response time—indicating the speed advantage that might be gained by storing frequently-accessed data on the outside of a physical disk drive platter, versus storage on the inside of the platter.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 2:
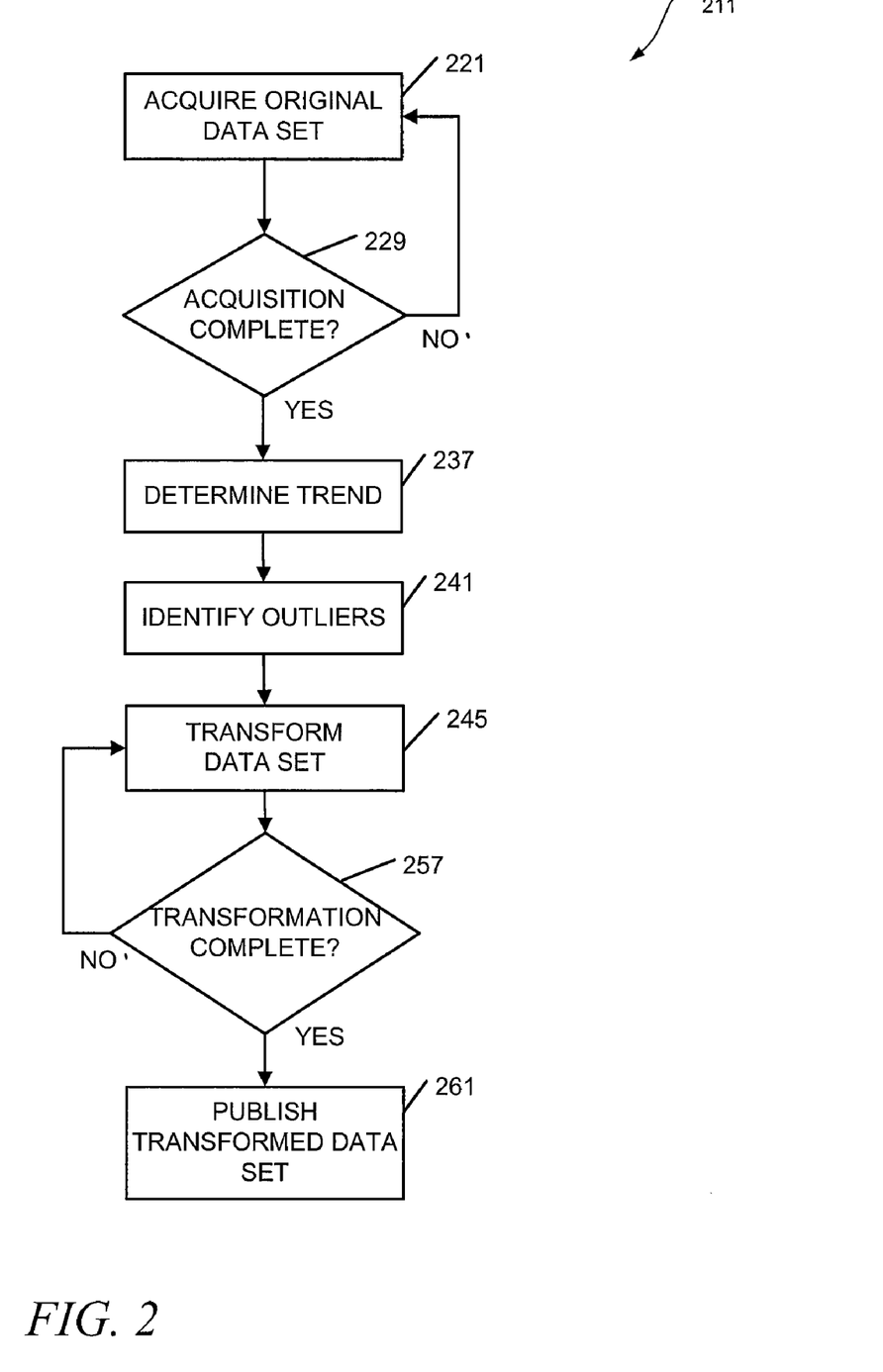
FIG. 2 is a flow diagram illustrating several methods of transforming an original data set by removing outliers according to various embodiments of the invention.

FIG. 2 is a flow diagram illustrating several methods 211 of transforming an original data set by removing outliers according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

In some embodiments, the method 211 comprises acquiring data in the form of measurements associated with device characteristics to produce the original data set, identifying and removing outlier data points ("outliers"), and publishing the result. For the purposes of this document, a "device characteristic" may comprise any one or more measurable aspects associated with a device, or its ability to perform a function. For example, a device characteristic might comprise a property of the device or one of its components (e.g., its color or shape), an indication of whether a physical element is present or absent (e.g., an automatic transmission in a car), the degree of functionality (or failure to function) of some portion of the device, among others. The presence of outliers in the original data set may then indicate, for example, that specific devices in a group are performing poorly, and should be replaced, such as a disk drive that fails to keep up with others in the same array. Similarly, the presence of outliers may also indicate exceptional performance by some members in a group.

Thus, a processor-implemented method 211 that can be executed on one or more processors that perform the method may begin at block 221 with acquiring an original data set comprising a series of data points having an independent portion and a dependent portion. The dependent portion can represent a measure of device performance that depends on at least one device characteristic represented by the independent portion.

For example, returning to the example of disk drive performance measurement described previously, the method 211 may be applied to determining access times for a disk drive. In this case, the independent portion may comprise a disk access location and the dependent portion may comprise an access time associated with the disk access location.

The method 211 may also be applied to determining random read response times for a disk drive. Thus, the disk access location may comprise a logical block address on a disk drive platter and the access time may comprise a random read response time across the disk drive platter.

In some embodiments, disk write request performance can be determined using the method 211. Thus, the activity at block 221 may comprise generating a random write request across a drive platter, and recording a write response time across the drive platter as part of the original data acquisition.

The method 211 can be implemented across multiple platters, either within a single disk drive, or as part of multiple drives in an array. Thus, the independent portion may comprise a disk access location and the dependent portion may comprise an access time associated with the disk access location, and the activity at block 221 may comprise generating a random read request to the disk access location across a plurality of drive platters, followed by recording a read response time as the access time across the plurality of drive platters.

The method 211 can be applied to a wide variety of storage devices, in addition to disk drives, such as flash memory, and other types of memory. Thus, the independent portion may comprise a memory access location and the dependent portion may comprise an access time associated with the memory access location.

The method 211 can also be applied to a wide range of rotating components that form a part of larger devices, such as crankshafts in automobile engines, rotors in electrical motors, and tires mounted to wheels. Thus, the independent portion may comprise a function measurement associated with a rotating component (e.g., amount of eccentricity) and the dependent portion may comprise a speed (e.g., revolutions per minute) at which the function is performed.

If the acquisition is deemed complete, as determined at block 229, then the method 211 may proceed on to block 237. If the acquisition is not yet complete, the method 211 may return to the acquisition activity at block 221.

The known trend can be identified in many ways. For example, by considering the operation of the underlying device, such as the known relationship between logical block access time for a disk platter, and the location of the block on the platter. Therefore, the method 211 may include, at block 237, determining the known trend by forecasting one of a rising trend or a falling trend. This may be accomplished by regression analysis in some embodiments.

The method 211 may then go on to block 241 to include identifying outlier data points in the series by determining, in comparison with all other members of the series, whether the outlier data points conform to a known trend of the series. There are several ways to determine whether specific points in the original data set conform to the known trend.

For example, determining which points in the original data set constitute outliers can include comparing the coordinates of outlier data points in two-dimensional space (e.g., on a grid or graph) or in three-dimensional space to the coordinates of other points in the original data set. Thus, the activity at block 241 may comprise comparing mapping coordinates in at least two dimensions associated with each one of the outlier data points to mapping coordinates in at least two dimensions associated with a previous point and a subsequent point in the series of data points.

The determination of which points in the series constitute outliers can also be made by assigning weight to various points in the series based on their coordinates, as described previously. Thus, the activity at block 241 may comprise weighting the outlier data points according to their mapping coordinates in at least two dimensions, in comparison with mapping coordinates in at least two dimensions associated with a previous point and a subsequent point in the series of data points.

The method 211 may continue on to block 245 with transforming the original data set into a transformed data set by removing the outlier data points from the series. Transformation may occur in a number of ways.

For example, returning to the memory device performance example, once it is determined (via data acquisition) which storage locations have a higher access speed, the performance of the device can be improved by storing data that is accessed more frequently in those locations. The overall performance gain of storing frequently accessed data in locations designated by "better performing" data points is realized in assigning less-frequently accessed data to the slower access locations (e.g., the inside of the drive platter) and more-frequently accessed data to faster locations (e.g., the outside of the drive platter). Thus, the activity at block 245 may comprise adjusting storage patterns in a memory device to substantially align data storage locations in the memory device having a higher speed of access (than some selected number of locations in the memory device) with data that is associated with more frequent access (than some selected number of accesses per unit time). That is, performance filters can be set up to determine what constitutes a "high" access speed, and "frequent" access.

Identifying outlier data points can become a repetitive process that is used to adjust the operation of a device until some selected level of the performance falls in line with the known trend. Thus, the activity of removing outliers may comprise substituting replacement devices or components associated with the outlier data points, including repeating the acquiring (block 221), the identifying (block 241), and the removing (block 245) until a selected acceptable number of outlier data points is obtained. This acceptable number may be any number, including two, one, or zero, for example, as well as a range of numbers.

Some embodiments focus on identifying outlier data points, and then removing them by adjusting the performance of the underlying device—looking specifically to those components that affect the performance that is measured. For example, if a specific component is known to produce outlier data points with respect to a particular kind of performance measure when it fails in a particular manner, then that component can be repaired or replaced to remove the identified outlier data points. In another example, such as disk drive access, logical blocks associated with identified outlier data points (e.g., slower than access associated with the known trend) can be eliminated as potential storage locations. Thus, the activity at block 245 may comprise transforming the original data set into a transformed data set by removing the outlier data points from the series, the removing comprising adjusting the device performance associated with components of the device represented by the outlier data points.

If the transformation of the original data set is deemed complete, as determined at block 257, then the method 211 may proceed on to block 261. If the transformation is not yet complete, the method 211 may return to the activity at block 245.

Thus, the method 211 may go on to block 261 to include publishing the transformed data set. It may be useful in some applications to print/display a record of the outlier data points, perhaps as they are removed from the original series of data points. Therefore, the activity at block 261 may further include one or more of printing or displaying a log of the outlier data points.

Many other embodiments are possible. For example, the method 211 can be used in the area of reducing image noise. Consider that at relatively high film speeds (e.g., an ISO film speed of 1600 versus an ISO film speed of 100) noise in the image can become a hindrance to the clarity and smoothness of photographs. As light hits an object, there is a known reflection trend with respect to the surface of the object, and shadows that are cast. The trend is that the image color is either getting lighter or darker. By assigning weight to pixels that do not agree with the general trend of the color in the image, and removing these outliers, noise can be filtered from a photograph to improve the overall image quality.

Thus, in some embodiments, a method 211 may include identifying outlier data points as representing noisy pixels in an original data set comprising a series of data points having an independent portion and a dependent portion. The independent portion in this case might represent the pixel location (X) on a portion of the digital image being processed. The dependent portion may represent a value (Y), such as a hexadecimal value corresponding to the color of the pixel at the location specified by the dependent portion. The act of identifying may then comprise determining, in comparison with all other members of the series, whether the outlier data points conform to a known trend of the series; and transforming the original data set into a transformed data set by removing the outlier data points from the series to remove noise from an image comprising pixels represented by the original data set.

The method 211 can be used to determine whether a meaningful trend is present in a data set. For example, if a trend is assumed for a set of data, and outlier data points are removed, the validity of the assumption can be determined by analyzing the magnitude of the transformed data set. It is up to the end user to determine the actual magnitude of a meaningful transformed data set corresponding to the assumption.

The methods described herein do not have to be executed in the order described, or in any particular order. Moreover, various activities described with respect to the methods identified herein can be executed in repetitive, serial, or parallel fashion. The individual activities of the methods shown in FIG. 2 can also be combined with each other and/or substituted, one for another, in various ways. Information, including parameters, commands, operands, and other data, can be sent and received in the form of one or more carrier waves. Thus, many other embodiments may be realized.

The methods shown in FIG. 2 can be implemented in various devices, as well as in a computer-readable storage medium, where the methods are adapted to be executed by one or more processors. Further details of such embodiments will now be described.

Figure 3:
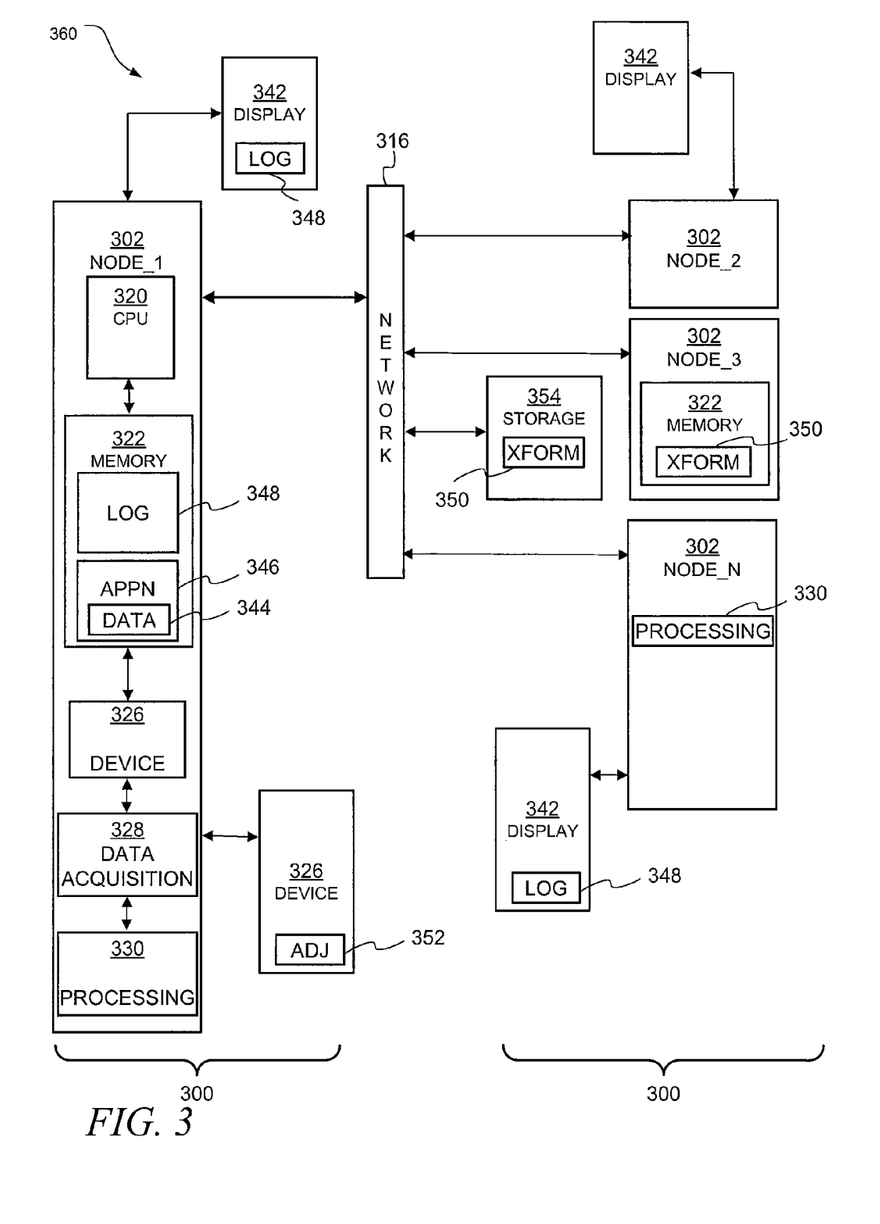
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement original data set transformation, via operations to remove outliers, may comprise one or more processing nodes 302, one or more processors 320, memories 322, one or more devices 326, a data acquisition module 328, a processing module 330, and one or more displays 342. The apparatus 300 may comprise a client, a server, or a networked processing node.

The processing nodes 302 may in turn comprise physical machines or virtual machines, or a mixture of both. The nodes 302 may also comprise networked entities, such servers and/or clients. In some cases, the operations described herein can occur entirely within a single node 302.

In some embodiments then, an apparatus 300 may comprise a data acquisition module 328 to acquire an original data set 344 comprising a series of data points having an independent portion and a dependent portion. The dependent portion, as noted previously, may represent a measure of device performance that depends on at least one device characteristic (e.g., a characteristic associated with one or more devices 326) represented by the independent portion.

The apparatus 300 may further include a processing module 330 to identify outlier data points in the series by determining, in comparison with all other members of the series, whether the outlier data points conform to a known trend of the series. The processing module 330 may operate to transform the original data set 344 into a transformed data set 350 by removing the outlier data points from the series.

The apparatus 300 may comprise a display 342 used to monitor the existence of outlier data points. Thus, the apparatus 300 may comprise one or more displays 342 to display a log 348 of the outlier data points over time.

The apparatus 300 may comprise memory to store the transformed data set 350. Thus, the apparatus 300 may further comprise a storage node 354 to store the transformed data set 350.

The apparatus 300 may be divided into parts: a first part to acquire data, and a second part to process the data. Thus, the apparatus 300 may comprise a first node (e.g., NODE_1) to house the data acquisition module 328, and a second node (e.g., NODE_N) to house the processing module 330.

The apparatus 300 may itself include the device whose performance is being measured. Thus, in some cases, apparatus 300 have the ability to monitor aspects of their own performance. Therefore, the apparatus 300 may comprise one or more devices 326 having at least one function associated with the measure of device performance and the device characteristic. For example, the device 326 may comprise one or more disk drives. The device 326 may comprise an adjustment module 352 that is configured to adjust the performance of the device 326 and thus, to change the measured characteristics of the device—perhaps resulting in removing outliers from the acquired data set.

Still further embodiments may be realized. For example, it can be seen that a system 360 that operates to implement original data set transformation, and to remove outliers, may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_2, NODE_3, . . . NODE_N.

The apparatus 300 and systems 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
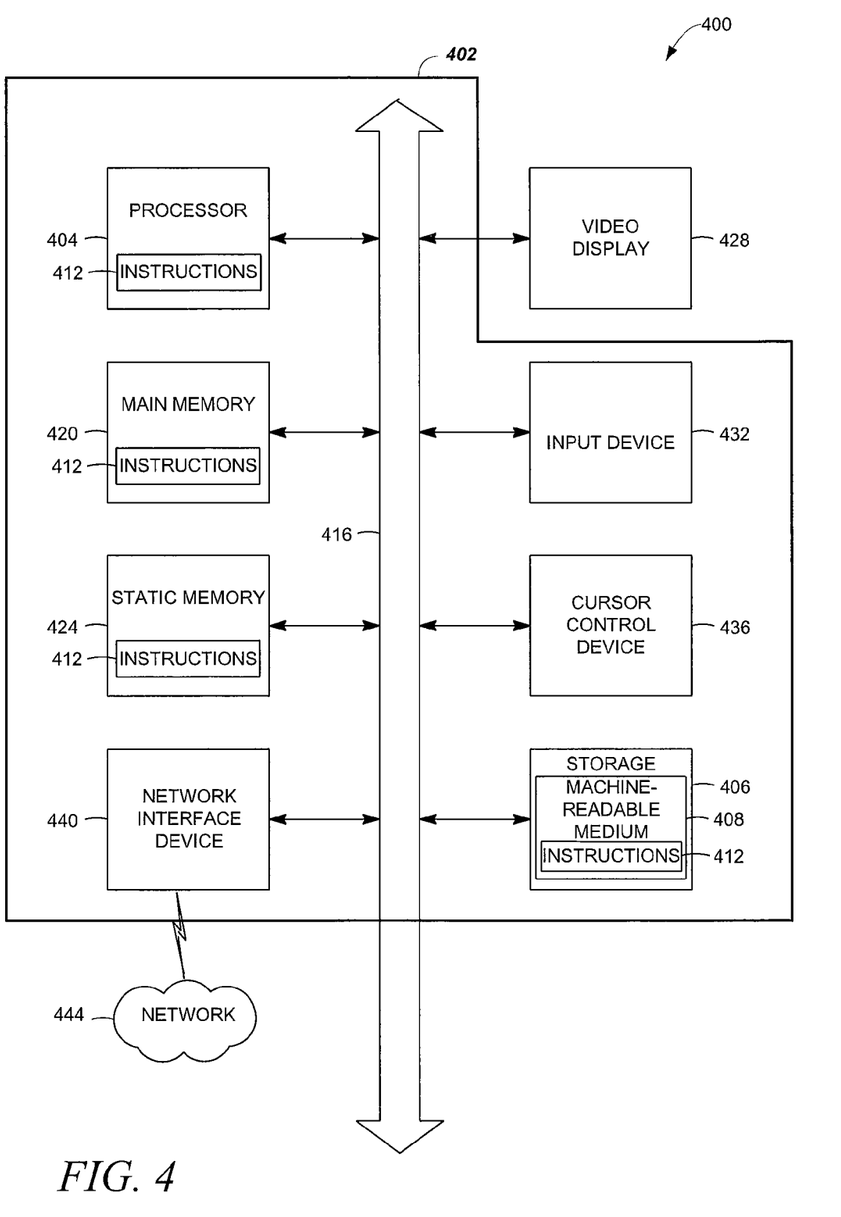
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412). The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to facilitate removing corrupted or otherwise extraneous data from an acquired original data set. This may include, for example, operations to filter device performance indications affected by mechanical limitations, such as disk read response times as they are affected by track-to-track transfer times and rotational latency. Similar results may be obtained in other fields of application. Increased accuracy in the interpretation and use of the acquired data may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a data acquisition module to acquire an original data set comprising a series of data points having an independent portion and a dependent portion, the dependent portion representing a measure of device performance that depends on at least one device characteristic represented by the independent portion; and
   a processing module to identify outlier data points in the series by determining, in comparison with all other members of the series, whether the outlier data points conform to a known trend of the series, and to transform the original data set into a transformed data set by removing the outlier data points from the series.

2. The apparatus of claim 1, further comprising:
   a display to display a log of the outlier data points over time.

3. The apparatus of claim 1, further comprising.
   a storage node to store the transformed data set.

4. The apparatus of claim 1, further comprising:
   a first node to house the data acquisition module; and
   a second node to house the processing module.

5. The apparatus of claim 1, further comprising:
   a device having at least one function associated with the measure of device performance and the device characteristic.

6. The apparatus of claim 5, wherein the device comprises a disk drive.

7. A processor-implemented method to execute on one or more processors that perform the method, comprising:
   acquiring an original data set comprising a series of data points having an independent portion and a dependent portion, the dependent portion representing a measure of device performance that depends on at least one device characteristic represented by the independent portion;
   identifying outlier data points in the series by determining, in comparison with all other members of the series, whether the outlier data points conform to a known trend of the series;
   transforming the original data set into a transformed data set by removing the outlier data points from the series; and
   publishing the transformed data set.

8. The method of claim 7, wherein the independent portion comprises a disk access location and the dependent portion comprises an access time associated with the disk access location.

9. The method of claim 8, wherein the disk access location comprises a logical block address on a disk drive platter and the access time comprises a random read response time across the disk drive platter.

10. The method of claim 7, further comprising:
    generating a random write request across a drive platter; and
    recording a write response time across the drive platter as part of the acquiring.

11. The method of claim 7, wherein the publishing comprises:
    one of printing or displaying a log of the outlier data points.

12. The method of claim 7, wherein the removing comprises:
    adjusting storage patterns in a memory device to substantially align data storage locations in the memory device having a higher speed of access than some selected number of locations in the memory device with data that is associated with more frequent access than some selected number of accesses per unit time.

13. The method of claim 7, wherein the removing comprises substituting replacement devices associated with the outlier data points, further comprising:
    repeating the acquiring, the identifying, and the removing until a selected acceptable number of outlier data points is obtained.

14. The method of claim 7, further comprising:
    determining the known trend by forecasting one of a rising trend or a falling trend.

15. A processor-implemented method to execute on one or more processors that perform the method, comprising:
    identifying outlier data points in an original data set comprising a series of data points having an independent portion and a dependent portion, the dependent portion representing a measure of device performance that depends on at least one device characteristic represented by the independent portion, wherein the identifying comprises determining, in comparison with all other members of the series, whether the outlier data points conform to a known trend of the series; and
    transforming the original data set into a transformed data set by removing the outlier data points from the series, the removing comprising adjusting the device performance associated with components of the device represented by the outlier data points.

16. The method of claim 15, wherein the determining comprises:
   comparing mapping coordinates in at least two dimensions associated with each one of the outlier data points to mapping coordinates in at least two dimensions associated with a previous point and a subsequent point in the series of data points.

17. The method of claim 15, wherein the determining comprises:
   weighting the outlier data points according to their mapping coordinates in at least two dimensions, in comparison with mapping coordinates in at least two dimensions associated with a previous point and a subsequent point in the series of data points.

18. The method of claim 15, wherein the independent portion comprises a disk access location and the dependent portion comprises an access time associated with the disk access location, further comprising:
   generating a random read request to the disk access location across a plurality of drive platters; and
   recording a read response time as the access time across the plurality of drive platters.

19. The method of claim 15, wherein the independent portion comprises a memory access location and the dependent portion comprises an access time associated with the memory access location.

20. The method of claim 15, wherein the independent portion comprises a function measurement associated with a rotating component and the dependent portion comprises a speed at which the function is performed.

* * * * *